(12) United States Patent
McCarthy et al.

(10) Patent No.: US 6,524,655 B2
(45) Date of Patent: Feb. 25, 2003

(54) SURFACE MODIFICATION USING HYDRIDOSILANES TO PREPARE MONOLAYERS

(75) Inventors: Thomas J. McCarthy, Hadley, MA (US); Alexander Y. Fadeev, Moscow (RU)

(73) Assignee: University of Massachusetts, Boston, MA (US)

( * ) Notice: Subject to any disclaimer, the term of this patent is extended or adjusted under 35 U.S.C. 154(b) by 0 days.

(21) Appl. No.: 09/946,006

(22) Filed: Sep. 4, 2001

(65) Prior Publication Data

US 2002/0018854 A1 Feb. 14, 2002

Related U.S. Application Data

(62) Division of application No. 09/313,051, filed on May 17, 1999, now Pat. No. 6,331,329.

(51) Int. Cl.[7] .................. B05D 3/02; B32B 15/08
(52) U.S. Cl. .................. 427/387; 148/240; 148/243; 148/248; 148/269; 427/255.18; 427/255.27; 428/450
(58) Field of Search ................. 148/240, 243, 148/248, 269; 427/255.18, 255.27, 387; 428/333, 447, 450, 429

(56) References Cited

U.S. PATENT DOCUMENTS

| | | | |
|---|---|---|---|
| 3,652,331 A | 3/1972 | Yamazaki | 117/201 |
| 4,486,495 A | 12/1984 | Matsushita et al. | 428/266 |
| 5,017,540 A | 5/1991 | Sandoval | 502/158 |
| 5,326,738 A | 7/1994 | Sandoval et al. | 502/401 |
| 5,629,088 A | 5/1997 | Ogawa et al. | 428/391 |
| 5,635,250 A | 6/1997 | Blum et al. | 427/387 |
| 5,707,683 A | 1/1998 | Currie et al. | 427/126.2 |
| 6,022,625 A | 2/2000 | Bremmer et al. | 428/447 |

FOREIGN PATENT DOCUMENTS

| | | |
|---|---|---|
| EP | 0 560 485 A1 | 9/1993 |
| EP | 0 625 532 A1 | 5/1994 |
| WO | WO 98/53921 | 12/1998 |

OTHER PUBLICATIONS

Sherwood et al., "Low Cost, Near–Net Shape Ceramic Composites Using Resin Transfer Molding and Pyrolysis (RTMP)", Ceramic Eng. Sci. Proc., 1996, vol. 17, pp. 174–183.

Gamble et al., "Interaction of Silane Coupling Agents with the TiO2(110) Surface", Langmuir, 1995, vol. 11, pp. 4505–4514.

Moses et al., "X–ray Photoelectron Spectroscopy of Alkylamine–Silanes Bound to Metal Oxide Electrodes", Analytical Chemistry, vol. 50, No. 4, Apr. 1978.

Yatsyuk et al., "The Chemisorption of Chlorotrimethyldisoloxane on the Surface of Pyrogenic Titanium Dioxide", Russian Journal of Physical Chemistry, vol. 62, No. 7, pp. 993–996, 1988.

Amati et al., "Nitrogen Adsorption Inostherms on MnO2–Type Oxide Surfaces", Langmuir, vol. 4, No. 2, pp. 329–336, 1988.

Tsubokawa et al., "Surface Grafting of Polymers onto Inorganic Ultrafine Particles: Reaction of Functional Poly. with Acid Anhydride Groups Intro. onto Inorganic Ultrafine Part", J. Pol. Sci., vol. 29, 697–702, 1991.

Tada, "Surfaces Properties of SiOx Monolayer Photochemically Formed on Oxide Semiconductors", Thin Solid Films, 281–282, pp. 404–408, 1996.

Ginko et al., Journal of Adhesion Sci. and Technology, 1997 11(5), 627.

*Primary Examiner*—D. S. Nakarani
(74) *Attorney, Agent, or Firm*—Fish & Richardson P.C.

(57) ABSTRACT

A method of modifying a surface is disclosed. The method includes contacting the surface with a hydridosilane under conditions and for a time sufficient to form a covalent bond between a silicon atom of the hydridosilane and the oxygen atom of a hydroxyl group on the surface. The hydridosilane has the formula Formula I

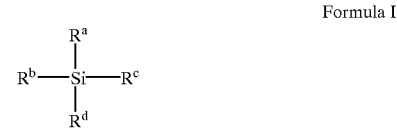

where at least one of $R^a$, $R^b$, $R^c$, and $R^d$ is H, and at least one of $R^a$, $R^b$, $R^c$, and $R^d$ is not H.

13 Claims, No Drawings

SURFACE MODIFICATION USING HYDRIDOSILANES TO PREPARE MONOLAYERS

CROSS-REFERENCE TO RELATED APPLICATION

This application is a divisional of U.S. application Ser. No. 09/313,051, filed on May 17, 1999, now U.S. Pat. No. 6,331,329, which is incorporated herein by reference in its entity.

FIELD OF THE INVENTION

The field of the invention is silane chemistry and modification of metal surfaces.

BACKGROUND OF THE INVENTION

Metal oxides and metals with oxide coatings are used to make various materials and components, including separation substrates for liquid and gas chromatography, substrates for capillary zone electrophoresis, biosensors, microelectronic devices, catalysts, fillers, and pigments. For many of these applications, it is desirable to modify the metal oxide surface, for example, by altering the adsorption, adhesion, wettability, or catalytic properties of the surface.

One way to modify a metal oxide surface is to attach to hydroxyl groups on the surface silane compounds having desired functional groups. Chlorosilanes and alkoxysilanes have been used for such surface modification. The use of these silane compounds can be problematic, however, because chlorosilanes and alkoxysilanes are moisture sensitive and sometimes act as corrosive agents. In addition, the reaction of chlorosilanes with metal oxide surfaces generates hydrochloric acid as a by-product, and the hydrochloric acid may corrode the modified metal oxide surfaces. Furthermore, some chlorosilanes and alkoxysilanes do not react with metal oxide surfaces.

SUMMARY OF THE INVENTION

In one aspect, the invention features a method of modifying a surface. The method includes contacting the surface with a hydridosilane under conditions and for a time sufficient to form a covalent bond between the silicon atom of the hydridosilane and the oxygen atom of a hydroxyl group on the surface. The hydridosilane has the formula

Formula I where each of $R^a$, $R^b$, $R^c$, and $R^d$ is, independently, H, linear $C_{1-30}$ alkyl, branched $C_{1-30}$ alkyl, cyclic $C_{3-30}$ alkyl, linear $C_{2-30}$ alkenyl, branched $C_{2-30}$ alkenyl, linear $C_{2-30}$ alkynyl, branched $C_{2-30}$ alkynyl, $C_{6-20}$ aralkyl, $C_{6-10}$ aryl, or a polymeric moiety having a molecular weight of about 1000 to about 100,000. The polymeric moiety is selected from the group consisting of hydrocarbon polymers, polyesters, polyamides, polyethers, polyacrylates, polyurethanes, epoxies, and polymethacrylates. Each of $R^a$, $R^b$, $R^c$, and $R^d$ is optionally substituted with one or more substituents selected from the group consisting of —F, —Cl, —Br, —CN, —NO$_2$, =O, —N=C=O, —N=C=S, —CH$_2$—CH$_2$—O—, —CH$_2$—CH$_2$—S—, —N$_3$, —NR$^e$R$^f$, —SR$^g$, OR$^h$, —CO$_2$R$^i$, —PR$^j$R$^k$R$^l$, —P(OR$^m$) (OR$^n$) (OR$^p$), —P(=O) (OR$^q$) (OR$^s$), —P(=O)$_2$OR$^t$, —OP(=O)$_2$OR$^u$, —S(=O)$_2$R$^v$, —S(=O)R$^w$, —S(=O)$_2$OR$^x$, —C(=O)NR$^y$R$^z$, and —OSiR$^{aa}$R$^{bb}$R$^{cc}$. Each of $R^e$, $R^f$, $R^g$, $R^h$, $R^i$, $R^j$, $R^k$, $R^l$, $R^m$, $R^n$, $R^p$, $R^q$, $R^s$, $R^t$, $R^u$, $R^v$, $R^w$, $R^x$, $R^y$, and $R^z$, is, independently, H, linear $C_{1-10}$ alkyl, branched $C_{1-10}$ alkyl, cyclic $C_{3-8}$ alkyl, linear $C_{2-10}$ alkenyl, branched $C_{2-10}$ alkenyl, linear $C_{2-10}$ alkynyl, branched $C_{2-10}$ alkynyl, $C_{6-12}$ aralkyl, or $C_{6-10}$ aryl, and is optionally substituted with one or more substituents selected from the group consisting of —F, —Cl, and —Br. Each of $R^{aa}$, $R^{bb}$, and $R^{cc}$ is, independently, linear $C_{1-10}$ alkyl, branched $C_{1-10}$ alkyl, cyclic $C_{3-8}$ alkyl, linear $C_{2-10}$ alkenyl, branched $C_{2-10}$ alkenyl, linear $C_{2-10}$ alkynyl, branched $C_{2-10}$ alkynyl, $C_{6-12}$ aralkyl, $C_{6-10}$ aryl, —F, —Cl, —Br, or OR$^{dd}$, where $R^{dd}$ is linear $C_{1-10}$ alkyl or branched $C_{1-10}$ alkyl. At least one of $R^a$, $R^b$, $R^c$, and $R^d$ is H and at least one of $R^a$, $R^b$, $R^c$, and $R^d$ is not H. Preferably, two or three of $R^a$, $R^b$, $R^c$, and $R^d$ are H.

The surface is preferably a metal surface. The metal surface can be selected from the group consisting of a titanium surface, a tin surface, an aluminum surface, an iron surface, a nickel surface, a chromium surface, a manganese surface, a zirconium surface, a niobium surface, a molybdenum surface, or a tungsten surface. The surface can also be a metal oxide surface or a metallate surface. Alternatively, the surface can contain a metal alloy. A preferred embodiment includes forming a monolayer-modified metal surface.

In another preferred embodiment, each of $R^a$, $R^b$, $R^c$, and $R^d$ is, independently, H, linear $C_{1-30}$ alkyl, branched $C_{1-30}$ alkyl, cyclic $C_{3-30}$ alkyl, linear $C_{2-30}$ alkenyl, branched $C_{2-30}$ alkenyl, linear $C_{2-30}$ alkynyl, branched $C_{2-30}$ alkynyl, $C_{6-20}$ aralkyl, or $C_{6-10}$ aryl. Preferably, at least one of $R^a$, $R^b$, $R^c$, and $R^d$ is linear $C_{1-20}$ alkyl, or branched $C_{1-20}$ alkyl, or phenyl. More preferably, at least one of $R^a$, $R^b$, $R^c$, and $R^d$ is unsubstituted linear $C_{1-20}$ alkyl, unsubstituted branched $C_{1-20}$ alkyl, or unsubstituted phenyl.

The invention also features a method of forming a monolayer-modified metal surface that includes contacting a metal surface with a hydridosiloxane-containing polymer under conditions and for a time sufficient to form a covalent bond between at least one silicon atom of the polymer and an oxygen atom of a hydroxyl group on the metal surface. The polymer has the formula $R^{dd}$[—O—Si($R^{ee}$) ($R^{ff}$)]$_n$-$R^{gg}$, where each of $R^{dd}$ and $R^{gg}$ is, independently, $C_{1-6}$ alkoxy or $C_{1-6}$ alkyl, each of $R^{ee}$ and $R^{ff}$ is, independently, H or $C_{1-6}$ alkyl, and n is 10 to 1000.

In preferred embodiments, the polymer is a copolymer of hydridomethylsiloxane and dimethylsiloxane. Preferably, the copolymer is at least 50 mol % hydridomethylsiloxane, about 25 mol % to about 30 mol % hydridomethylsiloxane, or about 1 mol % to about 5 mol % hydridomethylsiloxane.

The invention also features a surface that includes a plurality of M—O—Si— ($R^a$) ($R^b$) ($R^c$) moieties. M is Ti, Sn, Al, Fe, or Ni. One or two of $R^a$, $R^b$, and $R^c$ are H, and the remaining one or two of $R^a$, $R^b$, and $R^c$ are, independently, H, linear $C_{1-30}$ alkyl, branched $C_{1-30}$ alkyl, cyclic $C_{3-30}$ alkyl, linear $C_{2-30}$ alkenyl, branched $C_{2-30}$ alkenyl, linear $C_{2-30}$ alkynyl, branched $C_{2-30}$ alkynyl, $C_{6-20}$ aralkyl, or $C_{6-10}$ aryl, or a polymeric moiety having a molecular weight of about 1000 to about 100,000. The polymeric moiety is selected from the group consisting of hydrocarbon polymers, polyesters, polyamides, polyethers, polyacrylates, polyurethanes, epoxies, and polymethacrylates. Each of $R^a$, $R^b$, $R^c$, and $R^d$ is optionally substituted with one or more substituents selected from the group consisting of —F, —Cl, —Br, —CN, —NO$_2$, =O, —N=C=O, —N=C=S, —CH$_2$—CH$_2$—O—, —CH$_2$—CH$_2$—S—, —N$_3$, —NR$^e$R$^f$, —SR$^g$, —OR$^h$, —CO$_2$R$^i$, —PR$^j$R$^k$R$^l$, —P(OR$^m$) (OR$^n$) (OR$^p$)—P(=O) (OR$^q$) (OR$^s$)—P(=O)$_2$OR$^t$, —OP(=O)$_2$OR$^u$, —S(=O)$_2$R$^v$, —S(=O)R$^w$, —S(=O)$_2$OR$^x$, —C(=O)NR$^y$R$^z$, and —OSiR$^{aa}$R$^{bb}$R$^{cc}$. Each of R$^e$, R$^f$, R$^g$, R$^h$, R$^i$, R$^j$, R$^k$, R$^l$, R$^m$, R$^n$, R$^p$, R$^q$, R$^s$, R$^t$, R$^u$, R$^v$, R$^w$, R$^x$, R$^y$, and R$^z$, is, independently, H, linear C$_{1-10}$ alkyl, branched C$_{1-10}$ alkyl, cyclic C$_{3-8}$ alkyl, linear C$_{2-10}$ alkenyl, branched C$_{2-10}$ alkenyl, linear C$_{2-10}$ alkynyl, branched C$_{2-10}$ alkynyl, C$_{6-12}$ aralkyl, or C$_{6-10}$ aryl, and is optionally substituted with one or more substituents selected from the group consisting of —F, —Cl, and —Br. Each of R$^{aa}$, R$^{bb}$, and R$^{cc}$ is, independently, linear C$_{1-10}$ alkyl, branched C$_{1-10}$ alkyl, cyclic C$_{3-8}$ alkyl, linear C$_{2-10}$ alkenyl, branched C$_{2-10}$ alkenyl, linear C$_{2-10}$ alkynyl, branched C$_{2-10}$ alkynyl, C$_{6-12}$ aralkyl, C$_{6-10}$ aryl, —F, —Cl, —Br, or OR$^{dd}$, where R$^{dd}$ is linear C$_{1-10}$ alkyl or branched C$_{1-10}$ alkyl. Preferably, two of R$^a$, R$^b$, and R$^c$ are H. A preferred surface is a monolayer-modified metal surface.

As used herein, "monolayer-modified metal surface" means a surface including a plurality of silane moieties, substantially all of which are covalently bonded to oxygen atoms, which are covalently bonded to metal atoms.

DETAILED DESCRIPTION

The methods of the invention can be used to modify surfaces that react with the hydridosilane compounds, yielding modified surfaces containing covalently attached organosilane moieties. Functional groups on the organosilane moieties can be chosen to affect the properties of the modified surfaces advantageously.

Using hydridosilanes to modify surfaces according to the invention offers several advantages. Generally, hydridosilanes have lower boiling points than corresponding chlorosilanes and alkoxysilanes. Furthermore, hydridosilanes are not moisture sensitive and are not corrosive. In addition, they do not form corrosive by-products when they react with most surfaces, including metal oxide surfaces. Instead, the byproduct of the reaction is hydrogen gas (H$_2$). Consequently, hydridosilanes can be deposited using vapor phase techniques.

An exemplary reaction is the following:

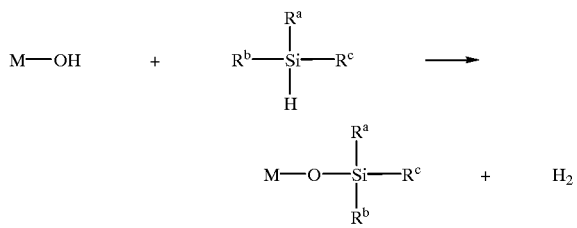

In the reaction shown above, a M—OH group on a metal surface reacts with the hydridosilane to produce a M—O—SiR$^a$R$^b$R$^c$ moiety, where M, R$^a$, R$^b$ and R$^c$ are as described above. The by-product of the reaction is hydrogen gas. The resulting surface has silane moieties covalently bonded to oxygen atoms, which are covalently bonded to metal atoms. Because —OH moieties are replaced with —O—SiR$^a$R$^b$R$^c$ moieties, the properties of the surface are altered.

Surfaces

Various surfaces can be modified according to the invention. The surfaces of titania powders, titania single crystals, titanium foils, and titanium films can be modified. Other metal surfaces, including tin, aluminum, iron, nickel, chromium, manganese, zirconium, niobium, molybdenum, and tungsten surfaces, can also be modified. Surfaces composed of oxides of one of these metals, for example, ceramic surfaces, can be modified as well. In addition, metallate surfaces, such as titanate, niobate, molybdate, or tungstate surfaces, can be modified. Surfaces that include alloys of these metals, for example, stainless steel, can be modified as well.

Hydridosilanes and Hydridosiloxane-containing Polymers

Various hydridosilanes and hydridosiloxane-containing polymers can be used in the invention. Dihydridosilanes are silanes of Formula I in which at least two of R$^a$, R$^b$, R$^c$, R$^d$ are H. Trihydridosilanes are silanes of Formula I in which at least three of R$^a$, R$^b$, R$^c$, and R$^d$ are H. Hydrido substituents are smaller than silane moieties with bulky substituents such as branched alkyl substituents. Dihydridosilanes and trihydridosilanes consequently provide higher degrees of surface coverage than that provided by monohydridosilanes. Examples of useful trihydridosilanes include C$_8$H$_{17}$SiH$_3$, C$_6$F$_{13}$(CH$_2$)$_2$SiH$_3$, C$_6$H$_5$SiH$_3$, CH$_2$=CH—CH$_2$SiH$_3$, Br(CH$_2$)$_3$SiH$_3$, and C$_{13}$H$_{37}$SiH$_3$.

For making hydrophobic surfaces, hydridosilanes with bulky alkyl or alkenyl groups are preferred. Examples of silanes useful for hydrophobic surfaces include (i—Pr)$_3$—SiH, t-BuSiMe$_2$H, C$_{18}$H$_{37}$SiMe$_2$H, and C$_6$F$_{13}$(CH$_2$)$_2$SiMe$_2$H.

In some embodiments, compounds containing more than one silicon atom are used. For example, polymers functionalized with one silane moiety per polymer to one silane moiety per monomer unit are sometimes used. Hydrocarbon polymers, such as polystyrene and polyethylene, functionalized with silane moieties can be used. In addition, functionalized polyesters, polyamides, polyethers, polyacrylates, polyurethanes, epoxies, and polymethacrylates can be used to modify surfaces.

In other embodiments, hydridosiloxane-containing polymers, such as copolymers of hydridomethylsiloxane and dimethylsiloxane, are used. Copolymers of hydridomethylsiloxane and dimethylsiloxane consist of monomeric units having the formulas [Si (H) (CH$_3$) —O—] and [Si (CH$_3$)$_3$ —O—]. Copolymers in which 3–50 mol % of the polymer is hydridomethylsiloxane are preferred. One advantage of using polymers instead of small molecules is that thicker monolayers can be formed when polymers are used.

Pretreatment of Surfaces

In some embodiments, it is desirable to pretreat the surfaces to ensure they are hydrated (i.e., hydroxylated) and clean, before forming the silane layer. Pretreatment can lead to higher surface coverage, more uniform surface coverage, or both. The surface pretreatment of planar substrates can be carried out as follows. A single crystal, foil, or film of titania is washed with water, a detergent such as sodium DDS, and/or an organic solvent. Useful solvents include methylene chloride, alkanes, diethyl ether, tetrahydrofuran, acetonitrile, ethyl acetate, benzene, ethanol, methanol and toluene. The substrate is then treated with a strong oxidizing agent, such as sulfuric acid, hydrogen peroxide, chromium acid, or oxygen plasma. Alternatively, the substrate can be heated in the presence of oxygen.

For disperse substrates (i.e., fine powders or porous materials with features of 1 μm or less), the surface pretreatment can be carried out by placing the substrate powders, porous particles, or membranes under vacuum at elevated temperatures. High temperatures, for example, 100–200° C., 20 mTorr, can be used. Alternatively, the substrate can be heated in the presence of oxygen.

Modification Reaction Conditions

Following the pre-treatment process, the surface is modified by a surface reaction with a hydridosilane. The modification reaction can be performed under various conditions. The modification reaction can be run in the vapor phase, in the liquid phase, or in supercritical fluids. In addition, the reaction can be performed in dilute or concentrated solutions, and at high or low temperatures.

In some embodiments it is advantageous to modify the surfaces using vapor phase deposition techniques, because the modification reactions are easier to perform in the vapor phase. An additional advantage is that when vapor phase techniques are used, fewer side products are generated. Surface modification using vapor phase techniques can be achieved by placing the substrate in an environment saturated with the desired hydridosilane vapor. The reaction mixture is maintained at room temperature or at an elevated temperature, for example, 100° C., for a duration ranging from several hours to several days. The temperature used is determined by the vapor pressure of the silane used.

Liquid phase modification is preferred for hydridosilanes with high boiling points, e.g., polymers, high molecular weight oligomers and octadecyldimethylsilane. Liquid phase modification can be carried out as follows. The substrate is covered with a solution of hydridosilane in an inert organic solvent. Solvents that may be used include liquid alkanes, benzene, and toluene. Alternatively, the substrate is covered with neat hydridosilane. The reaction mixture is maintained at room temperature or an elevated temperature for a period of time ranging from several hours to several days.

In general, the reaction between the hydridosilane and the hydroxyl groups on the surface occurs rapidly, at low temperatures. When the reaction occurs rapidly, heating, which can lead to poor monolayer packing, is not necessary. Hindered hydridosilanes (e.g.,tri-isopropylsilane and t-butyldimethylsilane) do not react with some surfaces at low temperatures, or react extremely slowly, so heating is necessary when these silanes are used. In many cases, 80% of the surface coverage is formed after one hour. The reaction time can be extended, e.g., to 24 hours, if denser coverage is desired.

Properties of Modified Surfaces

The invention can be used to improve adhesion to titania and oxidized titanium surfaces and for the lyophobization of titania and oxidized titanium surfaces. The methods are therefore useful for the surface modification of titania adsorbents, catalysts (e.g., photocatalysts), membranes, and chromatographic stationary phases. They are also useful for the preparation of chemically modified titania electrodes and sensors and for the preparation of well characterized self-assembling monolayers on single crystals of titania and on oxidized titanium surfaces. Specific uses include dental and medical implants and printing plate applications.

The modified surfaces have silane moieties covalently attached to the surfaces. The substituents of the silane moieties can be chosen to give the modified surfaces desired properties. For the hydrophobization of surfaces, silane moieties including unsubstituted linear or branched alkyl groups or aryl groups are preferred. For adhesion promotion, silane moieties in which $R^1$–$R^4$ are alkenyl groups or aryl groups are preferred. The alkenyl or aryl groups may be substituted with hydridosilyl groups, amino groups, chloro groups, bromo groups, alkoxy groups, or carboxy groups. For the oleophobization of surfaces, silane moieties in which $R^1$–$R^4$ are $C_{1-3}$ alkyl groups, branched alkyl groups, fluoroalkyl groups, alkylsiloxanes, or fluoroalkylsiloxanes are preferred.

For the surface modification of titania based electrodes, silane moieties in which $R^1$–$R^4$ are substituted with amino, chloro, bromo, alkoxy, carboxy, and hydridosilyl groups are preferred. For the preparation of titania chromatographic stationary phases and membrane applications, silane moieties in which $R^1$–$R^4$ are $C_{8-22}$ alkyl or $C_{1-10}$ aryl are preferred. The alkyl or aryl groups may be substituted with amino or carboxy groups.

In order that the invention may be more fully understood, the following specific examples are provided. The examples do not limit the scope or content of the invention in any way.

EXAMPLE 1

Titanium Foil/Tri-isopropylhydridosilane

Titanium foil was modified using tri-isopropylhydridosilane. The titanium foil (titanium 99.99%, 1.5×1.5 cm, 0.2 mm thick) was calcined in the oven in the presence of air at 450° C. for two hours.

The foil was allowed to cool to room temperature, then covered with a 5% solution of tri-isopropylhydridosilane in heptane (total volume 10 ml). The reaction mixture was held at room temperature for 120 hours. After the reaction was complete the sample was washed with heptane (5×20 ml), ethanol (3×20 ml), water (2×20 ml) and dried in the oven (100° C.) for 20 minutes.

The dynamic water contact angles (advancing and receding) were measured using a Rame-Hart telescopic goniometer. A sample with a higher contact angle is more hydrophobic than a sample with a lower contact angle. The water contact angle (advancing/receding) for the sample was 100°/46°. This result demonstrated that the modified titanium surface was more hydrophobic than the unmodified surface.

EXAMPLE 2

Titania Single Crystal/Octadecyltrihydridosilane

A titania single crystal (110, rutile) was modified using octadecyltrihydridosilane. The crystal was pretreated as follows. The crystal (10×10 mm, one side polished single crystal, 1 mm thick) was submerged in a 5% solution of sodium dichromate in 98% sulfuric acid for two hours. It was then rinsed with water (10×20 ml) and dried in the oven at 100° C. for one hour.

The crystal was taken from the oven and covered with 10 ml of heptane. Octadecyltrihydridosilane (0.5 ml) was then added by syringe. The reaction mixture was held at 60–70° C. for 24 hours. After the reaction was complete, the sample was washed with hot heptane (60° C.) (5×20 ml), heptane (5×20 ml), isopropanol (2×20 ml), water (2×10 ml), and dried in the oven at 100° C. for 20 minutes.

The water contact angle (advancing/receding) for the sample was 117°/100°. This result demonstrated that the modified titanium surface was more hydrophobic than the unmodified surface.

EXAMPLE 3

Titanium Film/Octyltrihydridosilane

Titanium film supported on a Si wafer was modified using octyltrihydridosilane in the vapor phase. The film (a ~0.4$\mu$ thick titanium layer supported on a 110 silicon wafer, 1.5×1.5 mm, 0.5 mm thick) was pretreated as described in Example 2.

The film was taken from the oven and placed in a flask containing 0.5 ml of octyltrihydridosilane. The flask was kept at 60–70° C. for 48 hours. After the reaction was complete, the sample was washed with heptane (5×10 ml), isopropanol (2×20 ml), water (2×10 ml) and dried in the oven at 100° C. for 20 minutes.

The water contact angle (advancing/receding) for the sample was 114°/98°. This result demonstrated that the modified titanium surface was more hydrophobic than the unmodified surface.

EXAMPLE 4

Titanium Film/Copolymer of Hydridomethyl-dimethylsiloxane

Titanium film supported on poly(ethyleneterephthalate) was modified using a copolymer of hydridomethyl-dimethylsiloxane. The film (a ~0.02µ thick titanium layer supported on poly(ethyleneterephthalate), 1.5×1.5 mm, 0.2 mm thick) was used without pretreatment.

The film was covered with 10 ml of heptane. Hydridomethyl-dimethylsiloxane copolymer (0.5 ml, 50% by mol of hydridomethylsiloxane units, MW 2000) was then added by syringe. The reaction mixture was kept at 60–70° C. for 48 hours. After the reaction was complete, the sample was washed with heptane (10×20 ml), isopropanol (2×20 ml), water (2×10 ml) and dried in the oven at 100° C. for 20 minutes.

The water contact angle (advancing/receding) for the sample was 102°/45°. This result demonstrated that the modified titanium surface was more hydrophobic than the unmodified surface.

EXAMPLE 5

Fumed Titania/Diphenyldihydridosilane

Fumed titania was modified using diphenyldihydridosilane. Titania powder (0.5 g, specific surface area ~50 m²/g, spherical non porous particles, 100% rutile, average particle size ~29 nm) was heated in an oven at 120° C. for two hours.

The powder was taken from the oven and covered with 10 ml of heptane. Diphenyldihydridosilane (0.5 ml) was added by syringe. The reaction mixture was held at 60–70° C. for 24 hours. After the reaction was complete, the sample was washed with heptane (60° C.) (5×20 ml), heptane (5×20 ml), evacuated at 20 mTorr overnight, then dried in the oven at 100° C. for one hour.

The water contact angle of this sample could not be measured. Instead, the hydrophobicity of the sample was determined by measuring the carbon content. The unmodified titania powder did not contain any carbon. The presence of carbon in the sample would indicate an increase in hydrophobicity. Carbon analysis showed that the sample contained 2.16 weight % C. This result indicated that the modified powder was more hydrophobic than the unmodified powder.

EXAMPLE 6

Stainless Steel/Octyltrihydridosilane

Stainless steel was modified using octyltrihydridosilane. A steel plate (15×15 mm, 0.5 mm thick) was rinsed with soap and water three times. The plate was then rinsed with water (5×10 ml), ethanol (2×10 ml), and water (3×10 ml). The plate was dried in the oven at 100° C. for two hours.

The plate was taken from the oven and covered with 10 ml of heptane. Octyltrihydridosilane (0.5 ml) was added by syringe. The reaction mixture was held at 60–70° C. for 24 hours. After the reaction was complete, the sample was washed with heptane (5×20 ml), isopropanol (2×20 ml), water (2×10 ml), and dried in the oven at 100° C. for 20 minutes.

The water contact angle (advancing/receding) for the sample was 105°/65°. This result demonstrated that the modified steel surface was more hydrophobic than the unmodified surface.

EXAMPLE 7

Nickel Foil/Octadecyltrihydridosilane

Nickel foil was modified using octadecyltrihydridosilane. A piece of foil (99.99% nickel, 15×15 mm, 0.2 mm thick) was pretreated as described in Example 2. It was also modified as described in Example 2.

The water contact angle (advancing/receding) for the sample was 128°/82°. This result demonstrated that the modified nickel surface was more hydrophobic than the unmodified surface.

EXAMPLE 8

Tin Foil/Tri-isopropylhydridosilane

Tin foil was modified using tri-isopropylhydridosilane. A square of foil (99.99% tin, 15×15 mm, 0.2 mm thick) was pretreated as described in Example 2. The modification was performed as described in Example 1.

The water contact angle (advancing/receding) for the sample was 82°/30°. This result demonstrated that the modified tin surface was more hydrophobic than the unmodified surface.

All publications and patents mentioned in this application are herein incorporated by reference to the same extent as if each individual publication or patent was specifically and individually indicated to be incorporated by reference.

From the foregoing description, it will be apparent that variations and modifications may be made to the invention. Such embodiments are included within the scope of the following claims.

We claim:

1. A method of modifying a surface, the method comprising contacting the surface with a hydridosilane under conditions and for a time sufficient to form a covalent bond between the silicon atom of the hydridosilane and the oxygen atom of a hydroxyl group on the surface, wherein the hydridosilane has the formula

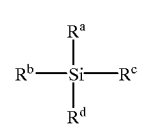

Formula I wherein each of $R^a$, $R^b$, $R^c$, and $R^d$ is, independently, H, linear or branched $C_{1-30}$ alkyl, cyclic $C_{3-30}$ alkyl, linear or branched $C_{2-30}$ alkenyl, linear or branched $C_{2-30}$ alkynyl, $C_{6-20}$ aralkyl, $C_{6-10}$ aryl, or a polymeric moiety having a molecular weight of about 1000 to about 100,000, wherein the polymeric moiety is selected from the group consisting of hydrocarbon polymers, polyesters, polyamides, polyethers, polyacrylates, polyurethanes, epoxies, and polymethacrylates, each of $R^a$, $R^b$, $R^c$, and $R^d$ being optionally substituted with one or more substituents selected from the group consisting of —F, —Cl, —Br, —CN, —NO$_2$, =O, —N=C=O, —N=C=S, —CH$_2$—CH$_2$—O—, —CH$_2$—CH$_2$—S—, —N$_3$, —NR$^e$R$^f$, —SR$^g$, —OR$^h$, —CO$_2$R$^i$, —PR$^j$R$^k$R$^l$, —P(OR$^m$)(OR$^n$)(OR$^p$), —P(=O)(OR$^q$)(OR$^s$), —P(=O)$_2$OR$^t$, —OP(=O)$_2$OR$^u$, —S(=O)$_2$R$^v$, —S(=O)R$^w$, —S(=O)$_2$OR$^x$, —C(=O)NR$^y$R$^z$, and —OSiR$^{aa}$R$^{bb}$R$^{cc}$, wherein each of $R^e$, $R^f$, $R^g$, $R^h$, $R^i$, $R^j$, $R^k$, $R^l$, $R^m$, $R^n$, $R^p$, $R^q$, $R^s$, $R^t$, $R^u$, $R^v$, $R^w$, $R^x$, $R^y$, and $R^z$, is, independently, H, linear or branched C$_{1-10}$ alkyl, cyclic C$_{3-8}$ alkyl, linear or branched C$_{2-10}$ alkenyl, linear or branched C$_{2-10}$ alkynyl, C$_{6-12}$ aralkyl, or C$_{6-10}$ aryl, and is optionally substituted with one or more substituents selected from the group consisting of —F, —Cl, and —Br, and wherein each of R$^{aa}$, R$^{bb}$, and R$^{cc}$ is, independently, linear or branched C$_{1-10}$ alkyl, cyclic C$_{3-8}$ alkyl, linear or branched C$_{2-10}$ alkenyl, linear or branched C$_{2-10}$ alkynyl, C$_{6-12}$ aralkyl, C$_{6-10}$ aryl, —F, —Cl, —Br, or OR$^{dd}$, wherein R$^{dd}$ is linear or branched C$_{1-10}$ alkyl, provided that at least one of $R^a$, $R^b$, $R^c$, and $R^d$ is H and at least one of $R^a$, $R^b$, $R^c$, and $R^d$ is not H.

2. The method of claim 1, wherein the surface is a metal surface.

3. The method of claim 2, wherein the metal surface is selected from the group consisting of a titanium surface, a tin surface, an aluminum surface, an iron surface, a nickel surface, a chromium surface, a manganese surface, a zirconium surface, a niobium surface, a molybdenum surface, and a tungsten surface.

4. The method of claim 3, wherein the metal surface is a titanium surface.

5. The method of claim 2, wherein the method comprises forming a monolayer-modified metal surface.

6. The method of claim 1, wherein the surface is a metal oxide surface.

7. The method of claim 1, wherein the surface is a metallate surface.

8. The method of claim 1, wherein the surface comprises a metal alloy.

9. The method of claim 1, wherein 2 of $R^a$, $R^b$, $R^c$, and $R^d$ are H.

10. The method of claim 1, wherein 3 of $R^a$, $R^b$, $R^c$, and $R^d$ are H.

11. The method of claim 1, wherein each of $R^a$, $R^b$, $R^c$, and $R^d$ is, independently, H, linear or branched C$_{1-30}$ alkyl, cyclic C$_{3-30}$ alkyl, linear or branched C$_{2-30}$ alkenyl, linear or branched C$_{2-30}$ alkynyl, C$_{6-20}$ aralkyl, or C$_{6-10}$ aryl.

12. The method of claim 11, wherein at least one of $R^a$, $R^b$, $R^c$, and $R^d$ is linear or branched C$_{1-20}$ alkyl.

13. The method of claim 12, wherein at least one of $R^a$, $R^b$, $R^c$, and $R^d$ is phenyl.

* * * * *